United States Patent [19]

Shui et al.

[11] Patent Number: 5,656,903
[45] Date of Patent: Aug. 12, 1997

[54] MASTER-SLAVE POSITION AND MOTION CONTROL SYSTEM

[75] Inventors: Fang Shui, Columbus; Robert G. Holmes, Hilliard, both of Ohio

[73] Assignee: The Ohio State University Research Foundation, Columbus, Ohio

[21] Appl. No.: 599,866

[22] Filed: Feb. 12, 1996

Related U.S. Application Data

[63] Continuation of Ser. No. 130,387, Oct. 1, 1993, abandoned

[51] Int. Cl.⁶ .................... B25J 3/00; H02K 29/06; G05B 19/42
[52] U.S. Cl. .................. 318/568.1; 318/628; 318/568.11; 901/4; 901/8
[58] Field of Search .................. 318/3–90, 560–696, 318/800–832; 901/3, 4, 6, 8, 9, 15; 395/80–83, 95, 96; 414/730, 732, 735

[56] References Cited

U.S. PATENT DOCUMENTS

| | | | |
|---|---|---|---|
| 3,497,778 | 2/1970 | Gerber | 318/8 |
| 3,575,647 | 4/1971 | Levy | 318/8 |
| 3,688,167 | 8/1972 | Ivey et al. | 318/45 |
| 3,707,721 | 12/1972 | McCartney | 318/625 |
| 4,046,262 | 9/1977 | Vukukai et al. | 414/5 |
| 4,661,032 | 4/1987 | Arai | 395/95 |
| 4,686,434 | 8/1987 | Kojima et al. | 318/52 |
| 4,782,258 | 11/1988 | Petrosky | 901/22 |
| 4,831,531 | 5/1989 | Adams et al. | 318/628 X |
| 4,834,319 | 5/1989 | Ewy et al. | 244/75 R |
| 4,853,874 | 8/1989 | Iwamoto et al. | 395/84 |
| 4,888,538 | 12/1989 | Dimitrov et al. | 318/675 |
| 4,906,908 | 3/1990 | Papiernik et al. | 318/600 |
| 5,004,391 | 4/1991 | Burden | 414/6 |
| 5,018,922 | 5/1991 | Yoshinada et al. | 901/8 X |
| 5,019,761 | 5/1991 | Kraft | 318/568.11 |
| 5,038,089 | 8/1991 | Szakaly | 318/568.11 |
| 5,053,975 | 10/1991 | Tsuchihashi et al. | 395/99 |
| 5,072,361 | 12/1991 | Davis et al. | 318/568.17 |
| 5,252,900 | 10/1993 | Uehara et al. | 318/568.11 |
| 5,327,986 | 7/1994 | Saita | 180/79.1 |
| 5,426,353 | 6/1995 | Stuhr et al. | 318/15 |

*Primary Examiner*—Paul Ip
*Attorney, Agent, or Firm*—Kremblas, Foster, Millard & Pollick; Frank H. Foster

[57] ABSTRACT

Both a pneumatic, linear actuator operating as a slave actuator and a master linear actuator formed by an electric motor driven screw mechanism are linked to drive a load. The high accuracy master linear actuator has a conventional control system which dominates the control of load position or other control variable. A force sensor detects the force applied to the load by the master actuator or the force is calculated by a computer and the sensed force signal is applied to a slave actuator control to cause the slave to apply a supplemental force, typically considerably greater than the master actuator force, to the load as a function of the master actuator force. This obtains the high accuracy characteristic of the master actuator system simultaneously with the high force characteristic of the slave actuator.

16 Claims, 11 Drawing Sheets

MASTER-SLAVE POSITION AND MOTION CONTROL SYSTEM

This application is a continuation of application Ser. No. 08/130,387, filed on Oct. 1, 1993, now abandoned.

This invention was made with government support under Grant No. 58-3607-0-129 awarded by the Agricultural Research Service of the U.S. Department of Agriculture. The government has certain rights in the invention.

TECHNICAL FIELD

This invention relates generally to systems utilizing mechanical actuators with associated controls for the precise positioning or moving of a mechanical body. The mechanical body may be generally called a load or is sometimes referred to as a process, such as a manufacturing process being controlled. Such systems are commonly used, for example, in robotics and other automated manufacturing systems, as well as in numerous mechanical devices. The invention is more particularly directed to a system for controlling the accurate positioning, displacement or motion of a mechanical body featuring the use of two different types of mechanical actuators having different operating characteristics. They are controlled in a manner to attain both highly accurate positioning and movement which are characteristic of one type of actuator and its control system and simultaneously attaining high force and power characteristics of another type of actuator.

BACKGROUND ART

A variety of different mechanical actuator systems are known for the purpose of moving mechanical bodies. These include, for example, fluid systems utilizing pneumatic and hydraulic cylinders, electric motor driven screw mechanisms, or other mechanical devices. Each type of actuator system has a set of associated characteristics and features, including accuracy, range of force or power it can apply, and cost. For example, fluid systems, such as pneumatic cylinders, while they exhibit fairly accurate control when they are operating against stops for controlling their position, are not very accurate at mid-stroke positions between such stops. Pneumatic actuating systems are able to apply large forces and high speed but are very sensitive to variations in load and to other working conditions, such as air pressure change and the stroke position due to the significant compressibility and high non-linear property of the pressurized air, and consequently may assume one position with one particular load and working condition and other positions for other loads and conditions for the same control input signal.

Other systems, such as a screw mechanism driven by an electric motor, exhibit very accurate control, or superior controllability, and flexibility, but are limited in the force or power they can apply to the load. The accuracy deficiencies of fluid systems are sometimes overcome by the use of servo hydraulic valves, but such valves are very complicated and very expensive and are sensitive to inaccuracies created by fluid contamination.

In high performance applications, the dc servo motor still predominates because of its versatility. However, in recent years there is a trend that ac servo motors are beginning to replace dc servo motors on many fronts where controllability is of primary importance. The advantages of an ac servo motor are robustness, overload capability and maintenance free feature. Nevertheless, the control system and algorithm of an ac servo motor are much more complex than that of a dc servo motor, therefore the cost of an ac servo system is high. Although electric motor systems have many superior control features, the limitation of power availability, small ratio of torque-to-weight-and-size size, and high cost as power output of the electric motor increases are their common disadvantages.

It is therefore an object and feature of the present invention to combine two different actuator and control systems in a manner which does not provide a mere compromise between the desirable force or power characteristics of one and the desirable accuracy characteristics of the other. Rather, they are combined in a manner which provides at least the same, close tolerance performance and accuracy of a more accurate actuator system with the desirable high power or force characteristics of the less accurate, higher power range system.

U.S. Pat. No. 4,782,258 discloses a robotic joint actuator, utilizing both the quick response time of an electric motor and the high torque capacity of a pneumatic motor by mechanically linking them together so that the electric motor and the fluid motor drive the same load. It discloses a controller, including a computer, which adjusts the fluid motor torque so that the electric motor torque is decreased to prevent the electric motor from overheating, and adjusts the electric motor torque to compensate for torque deficiencies of the fluid motor. That structure is directed to the transient torque characteristics of the two motors and does not attempt to control position or motion of a mechanical body because its control system is entirely different than that of the present invention.

BRIEF DISCLOSURE OF INVENTION

In the present invention a master actuator which is capable of highly accurate positioning and movement, such as a ball screw driven by an electric motor, is controlled by a control system, such as a conventional closed loop control or servo system and is mechanically linked to drive a load which is a mechanical body. A closed loop control system for a master actuator detects one or more controlled variables, such as body position, velocity or acceleration by means of conventional sensors and compares the detected controlled variables to reference inputs representing the desired value of the controlled variables. The difference between the detected controlled variables and the desired value of controlled variables provides error signals to drive the actuator which provides control in the conventional manner. Usually, the output of the master actuator, such as its force or power, is limited. However, a conventional open loop control system may also be used in which the master actuator output has a controlled variable value which is a known function of its reference input even in the absence of a feedback loop, but the open loop systems are commonly less accurate.

A different type of actuator, such as a pneumatic cylinder, operates as a slave actuator and is also mechanically linked to the load. The force applied to the load by the master actuator is either detected by a force sensor or is calculated by a controlling computer from the reference input to the master actuator control (which determines a control variable such as displacement, velocity or acceleration) and other preselected system parameters such as load mass. The signal representing the force applied by the master actuator is applied to a slave actuator control system. The slave control system actuates the slave actuator to drive the slave actuator with a force which is a function of the force applied by the master actuator. For example, the slave control system may drive the slave actuator with a force which is directly proportional to the force applied by the master actuator. Alternatively, the force applied by the slave actuator may be some other increasing function of the force applied by the master actuator, such as, for example, the square of that force. As another alternative, the slave actuator may be operated in an on/off mode, wherein it is completely off, applying no force, for master actuator forces below a selected level and is turned completely on to exert its force for detected master actuator forces above the selected level.

The highly accurate master control system dominates and determines the control function of the positioning or other variable parameter of the system as a whole. However, the force or power applied by the master is supplemented by a force or power applied by the slave actuator which is considerably greater than the force or power applied by the master. These principles apply algebraically, that is in both positive and negative directions, for example upon acceleration and deceleration. In the event of a sufficiently small load force, the slave actuator may not even be operated because the master actuator can thus provide 100% of the required force or power to accurately drive the load.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or linked or terms similar thereto are often used. They are not limited to direct connection but include connection through other elements where such connection is recognized as being equivalent by those skilled in the art.

DETAILED DESCRIPTION

Figure 1:
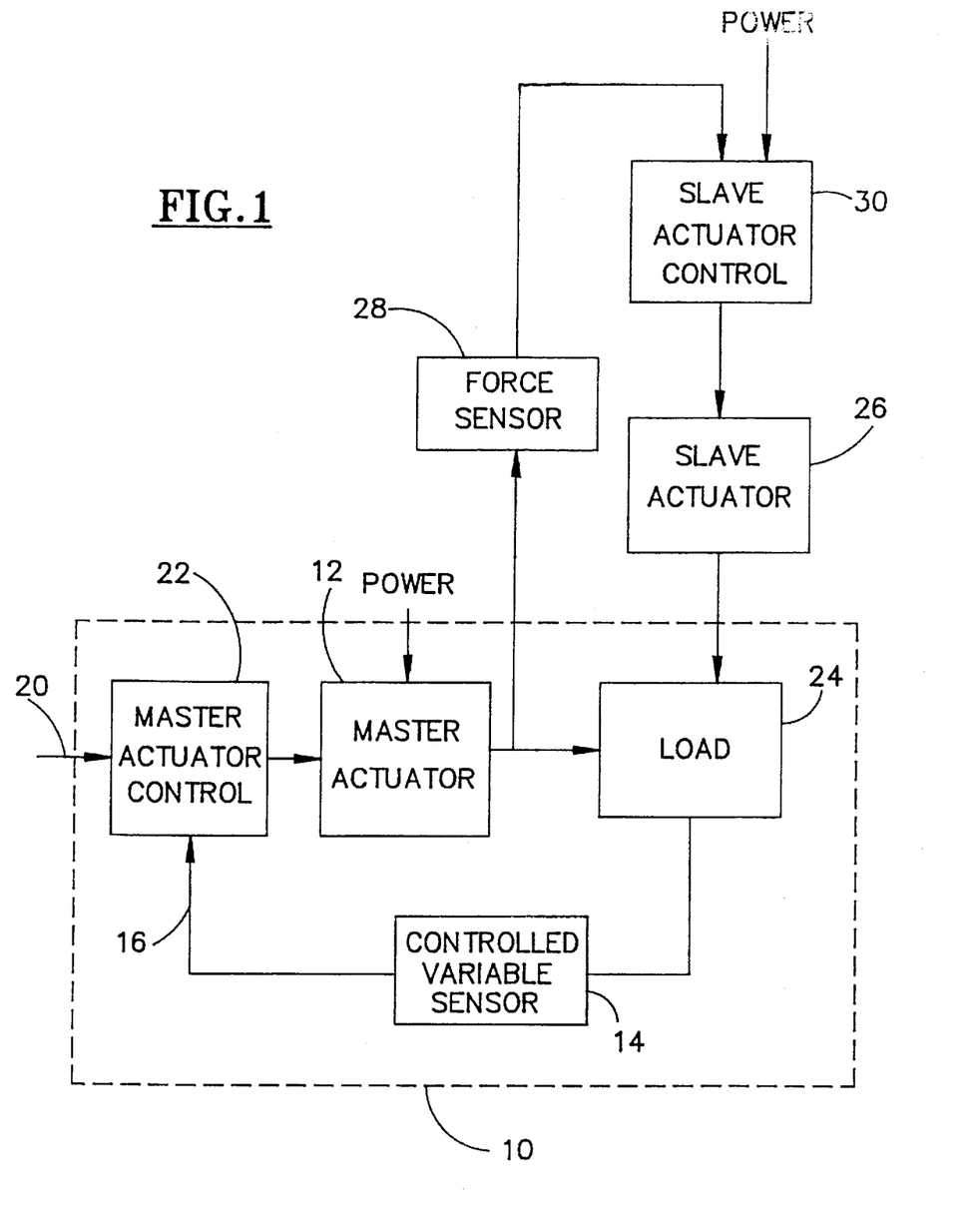
FIG. 1 is a block diagram illustrating the general principles of the invention.

The block diagram of FIG. 1 illustrates the principles of the present invention. It includes a conventional, negative feedback servo system 10 contained within the dashed-line box. Other conventional control systems for controlling a single actuator may also be used. For example, a stepper motor combined with a shaft encoder system can be used. The servo system 10 includes a master actuator 12, such as a linear actuator or rotary actuator which may, for example, include an electric motor powered screw jack linear actuator. In the conventional manner a controlled variable sensor 14 detects the controlled variable, such as load position, and supplies a signal which is proportional to that controlled variable to the input 16 of a master actuator control 22. A reference input signal 20 is also applied to a master actuator control 22 and the difference between the controlled variable signal at input 16 and the reference input signal at input 20 represents an error signal which is applied to a master actuator control circuit 22. The servo system 10 operates in the conventional manner according to negative feedback control principles, driving the master actuator 12 to a value of the controlled variable, such as position, which makes the error signal near zero. The master actuator 12 is mechanically linked to a load 24 formed by a mechanical body so that it may apply a driving force to the load 24.

A slave actuator 26, which is a linear or rotary actuator, is also mechanically linked to the load 24. A force sensor 28 is preferably physically mounted to the master actuator 12 to detect the force applied to the load by the master actuator 12 and provide a signal representing that force to the input of a slave actuator control 30.

The slave actuator control 30 has an output connected to the slave actuator 26 and controls the slave actuator so that it applies a force which is a function of the force applied by the master actuator 12 and detected by the force sensor 28 in FIG. 1.

Thus, it can be seen from FIG. 1 that the control of the controlled variable lies solely within the servo or other system 10, controlling only the master actuator 12. The slave actuator 26 provides a force which supplements the force applied by the master actuator 12 in accordance with a suitable mathematical, slave control algorithm, which is an increasing function of the force detected by the sensor 28.

For example, if an electric motor powered screw mechanism, which has a characteristic high accuracy, is selected for the servo system 10, then the accuracy with which the controlled variable, such as position, is attained will be dependent essentially entirely upon the accuracy of that master actuator and its control system. However, such linear actuators are limited by their capability of providing only relatively small force or power, except at great expense and with very large size units. Therefore, a pneumatic system, which exhibits the characteristics of relatively low expense and high power capability can be utilized as the slave actuator to provide supplemental force or power greatly exceeding the force or power which may be applied by the master actuator 12 and yet leaving the controlled variable, such as load position, entirely determined by the highly accurate master actuator servo system 10.

Figure 6:
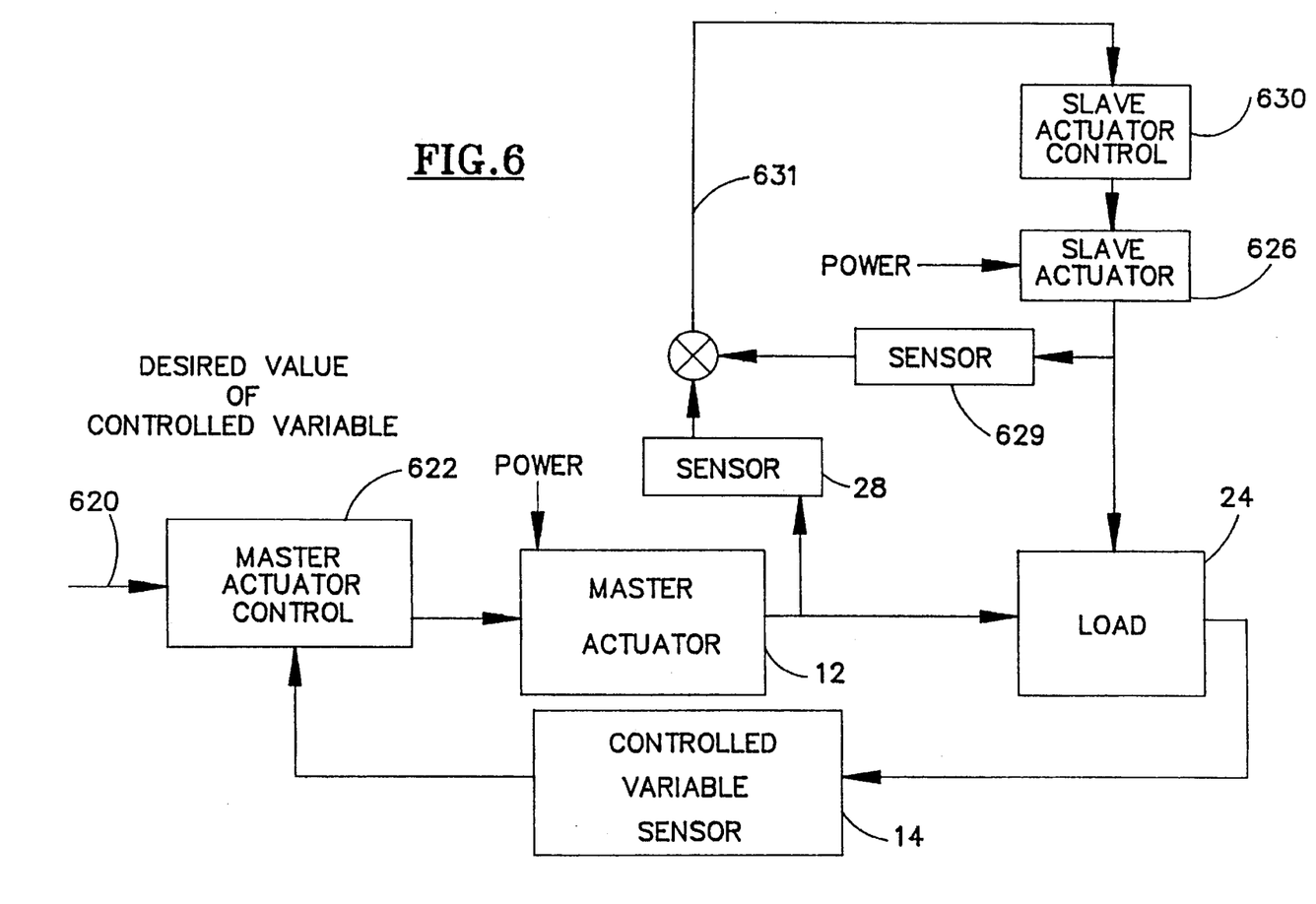
FIGS. 6, 7, 8 and 9 are block diagrams illustrating various alternative arrangements of the components of the present invention.

An alternative slave control is shown in FIG. 6 in which a closed loop slave control is formed. A force sensor 629 is mounted to a slave actuator 626 to detect the force applied to the load by the slave actuator 626. The input 631 of a slave actuator control 630 is the difference between the force applied to the load by the slave actuator which is detected by the sensor 629 and the force applied to the load by the master actuator which is detected by the sensor 28. The use of a closed loop control in the slave actuator system permits the force or power applied by the slave actuator to be more accurately controlled as a function of the master actuator force detected by force sensor 628.

Figure 13:
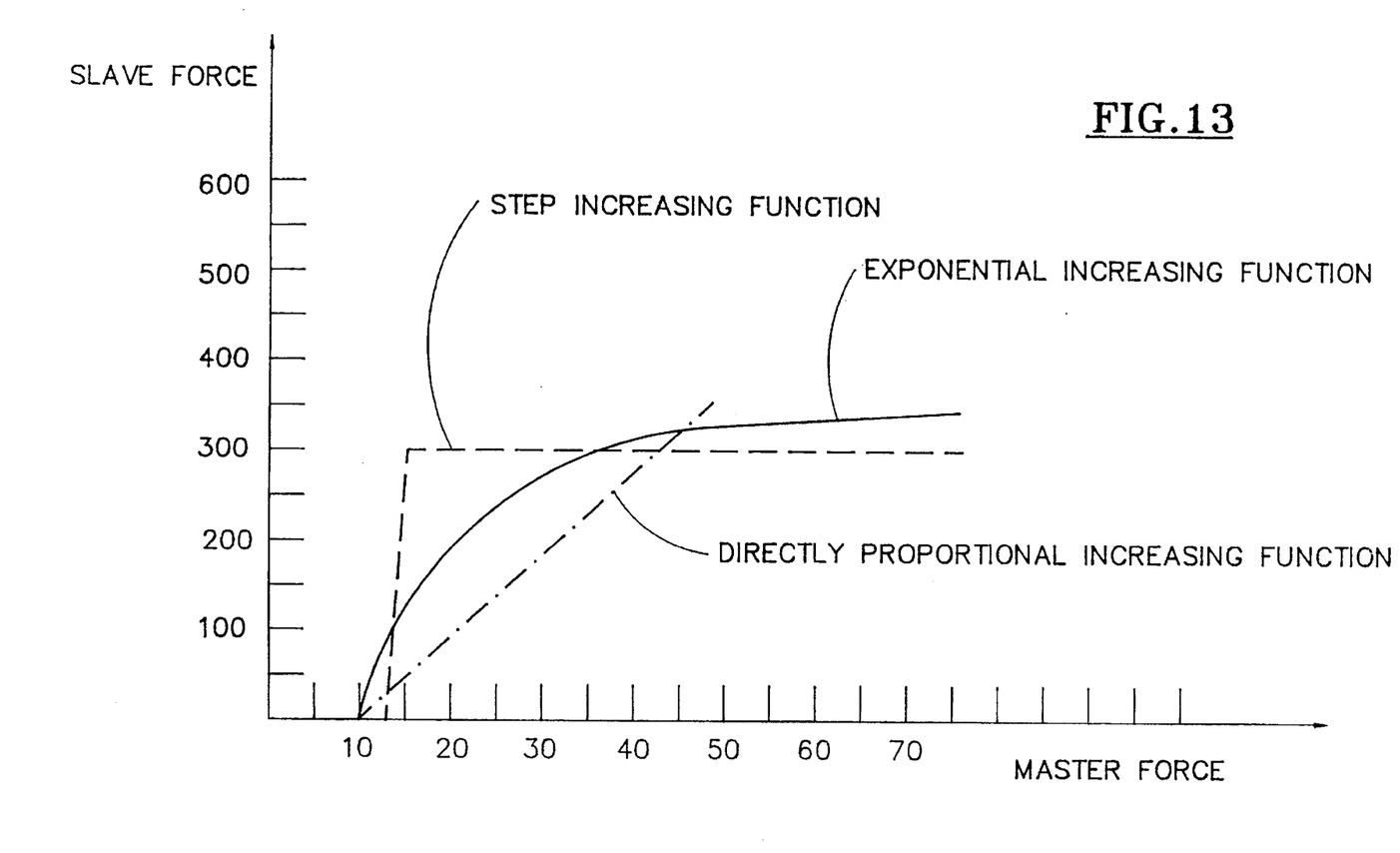
FIG. 13 is a graph illustrating control algorithms.

There are a variety of alternative slave actuator control algorithms which may be utilized for actuating the slave actuator 26 in response to the master actuator force detected by the sensor 28 in the embodiment of FIG. 1. For example, FIG. 13 graphically illustrates examples of such control algorithms. As one example, the slave actuator, such as a pneumatic or hydraulic cylinder, may be controlled with a continuously variable valve so that it applies a force which is directly proportional to the force applied by the master actuator over a selected range of master actuator force, for example between ten and forty pounds of force. Of course, as would be apparent to those skilled in the art, many other increasing functions other than direct proportionality may also be used as the control algorithm for the slave actuator control 30.

As an alternative but less desirable embodiment, the control algorithm may be a simple on/off system in which the slave control opens a valve to operate the slave actuator when the detected master actuator force exceeds a selected value and closes the valve to halt the application of power to the slave actuator when the slave actuator force is less than the selected value.

While the most common controlled variable is position, which is ordinarily displacement from a reference position, in other systems it may be velocity, acceleration or some other controlled variable. Further, the invention is not limited to linear actuation in which a force is applied, but also includes rotational actuation and the application of a torque. Thus, in this description the word force is used generally to include both a linearly applied force or force component, as well as a torque.

Figure 10:
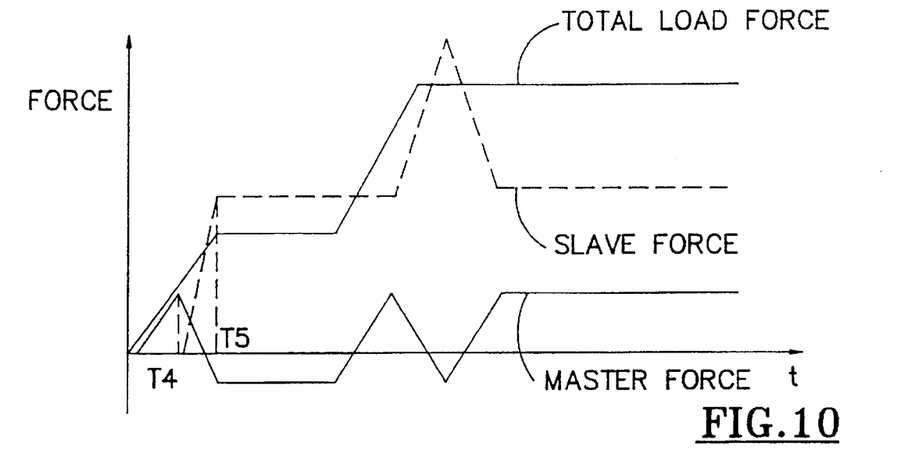
FIGS. 10 and 11 are graphs illustrating the operation of a slave actuator utilizing proportional control.
Figure 11:
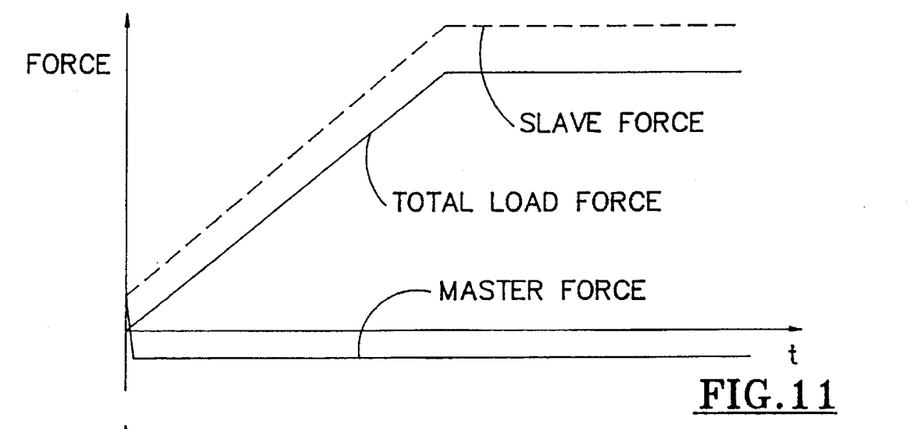
Figure 12:
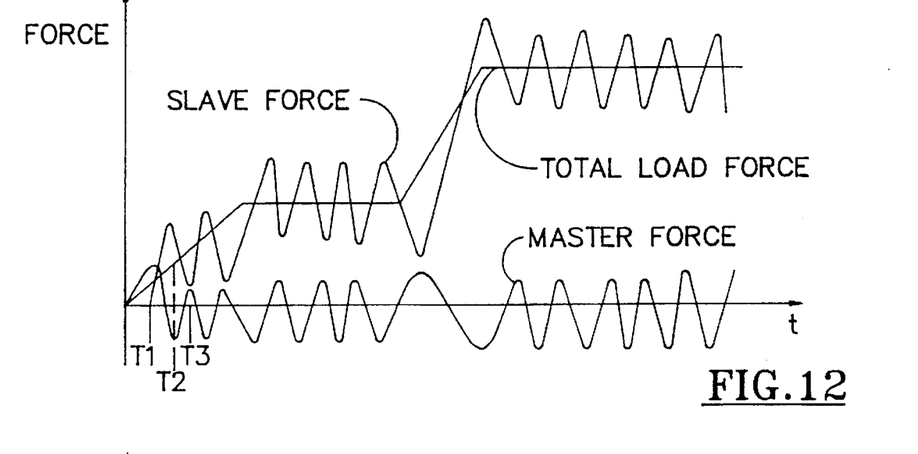
FIG. 12 is a graph illustrating the operation of an embodiment of the invention with a slave actuator operating in an on/off mode.

In a preferred embodiment of the invention, most of the power comes from the slave actuator, while accuracy comes from the master actuator and its control. The distribution or ratio of power from each can be changed and varied by selection of the particular control algorithm. FIGS. 10, 11, and 12 illustrate the distribution or ratio of power applied to the load from the master actuator and the slave actuator as a function of time for three different, representative sets of conditions. They illustrate that the slave force can be larger or smaller than the total load force, and the force difference or error between the total load force and the force applied by the slave actuator is compensated by the master actuator. The invention therefore provides the accuracy of the master and the force of the slave and operates effectively even when the load varies during operation.

Conventional servo systems purchased from commercial sources may be utilized for the servo system 10 illustrated in FIG. 1. For example, an electric linear actuator model H992B and an electric linear motion control system model H3851 (Industrial Devices Corporation) have been utilized in constructing an embodiment of the invention. Experimentation has shown that the accuracy attributed to this conventional unit of 0.003 inches is also the accuracy attained by an embodiment of the invention even though the master actuator force or power is supplemented by the considerably greater force or power of a considerably less accurate actuator system.

Figures 2, 2A:
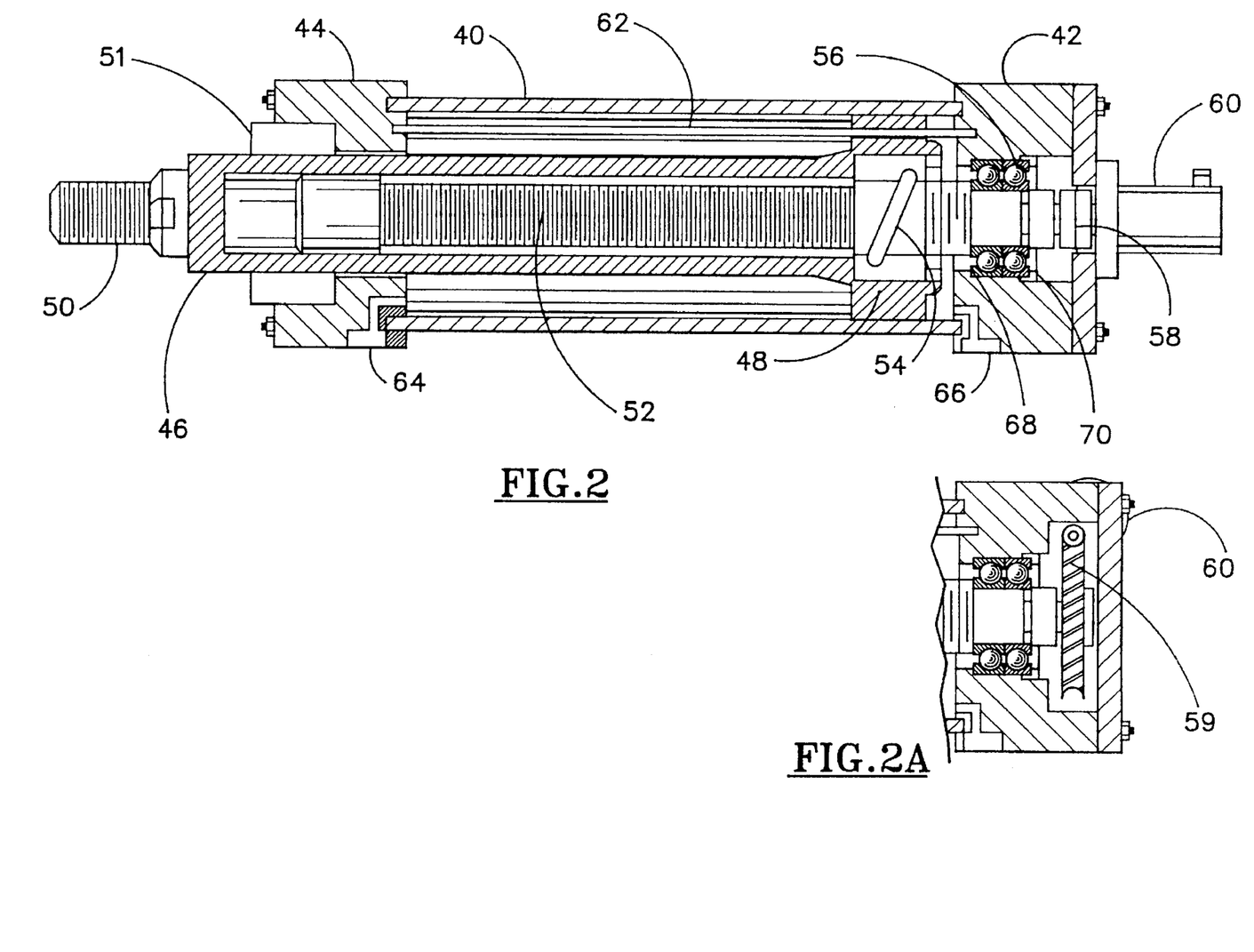
FIG. 2 is a view in axial section of an electropneumatic, linear actuator designed for use in the preferred embodiment of the invention.
FIG. 2A is a view in axial section of an alternative motor drive for the embodiment of FIG. 2.

FIG. 2 illustrates a linear actuator unit which combines both an electric motor powered screw mechanism and a fluid cylinder in a single unit. That unit has a surrounding, fluid containing cylinder 40 sealed at one end by a rear cap and housing 42, and at the opposite end by a front cap 44. A coaxial, cylindrical thrust tube 46 has a piston 48 formed at one end and is linearly slidable in telescopic relation within the cylinder 40 to operate as a hydraulic piston and associated connecting rod having a threaded bolt 50 for connection to a load. The thrust tube 46 is sealingly slidable in the front cap 44 and sealed by a slide bearing 51. Coaxially mounted within the thrust tube 46 is a conventional ball or acme-type screw 52 which is threadedly engaged to a nut 54 in the conventional manner. The screw 52 is rotatably mounted in a thrust bearing 56 and drivingly connected through a flex-type coupling 58 to the electric motor 60, or alternatively through worm gearing 59, illustrated in FIG. 2A, to the electric motor 60. A guide bolt 62 extends through the cylinder parallel to its axis and slidably engages the nut 54 to prevent rotation of the nut 54 during actuation. Suitable fluid ports 64 and 66 are provided through the cap of the cylinder 40 for forcing the piston 48 in either of its two opposite directions of travel.

In order to provide for the sensor 28 illustrated in FIG. 1, force transducers 68 and 70 may be mounted at axially opposite ends of the thrust bearing 56 to detect the force applied by the master actuator, motor powered screw mechanism. Consequently, the unit illustrated in FIG. 2 includes both an electrically powered master actuator and a fluid powered, linear, slave actuator. The mechanical advantages of the screw mechanism 52 and the gearing 59, as well as the electric motor 60 can be selected according to the requirement of the holding capability with the actuating system and the correcting capability of the control error of the slave system.

As will be apparent to those skilled in the electric motor art, the force applied by an electric motor may alternatively be detected by sensing the power input to the electrical motor rather than utilizing a mechanical force sensor. For example, suitable conventional sampling circuitry for detecting the motor voltage and current, from which the power may be calculated, may be utilized to detect a force or torque signal for application to a control computer. Thus, one form of force sensor which may be used is a circuit which detects the force from the motor's electrical input parameters. The control circuits for the linear actuator of FIG. 2 are not illustrated in FIG. 2.

Figure 7:
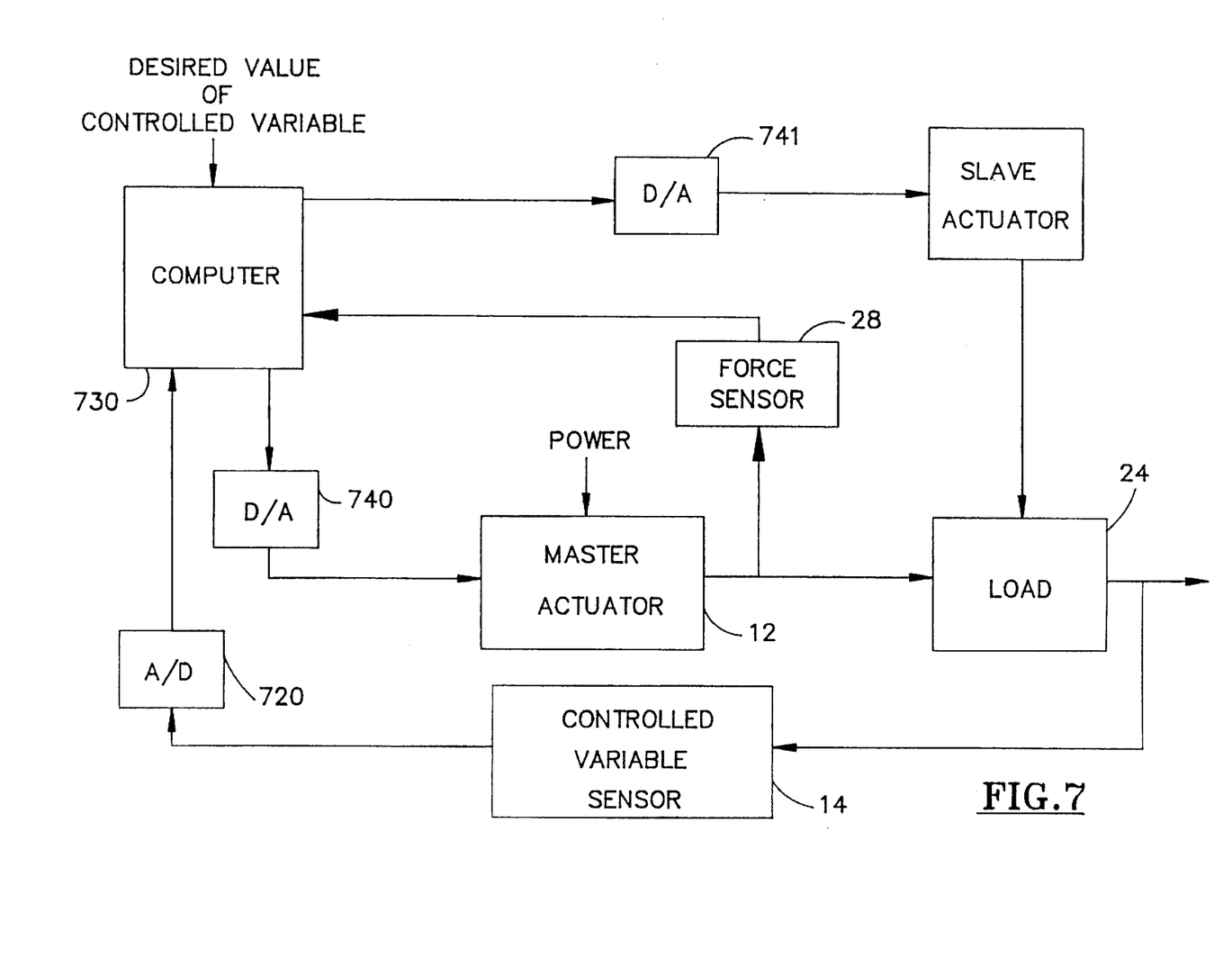
Figure 8:
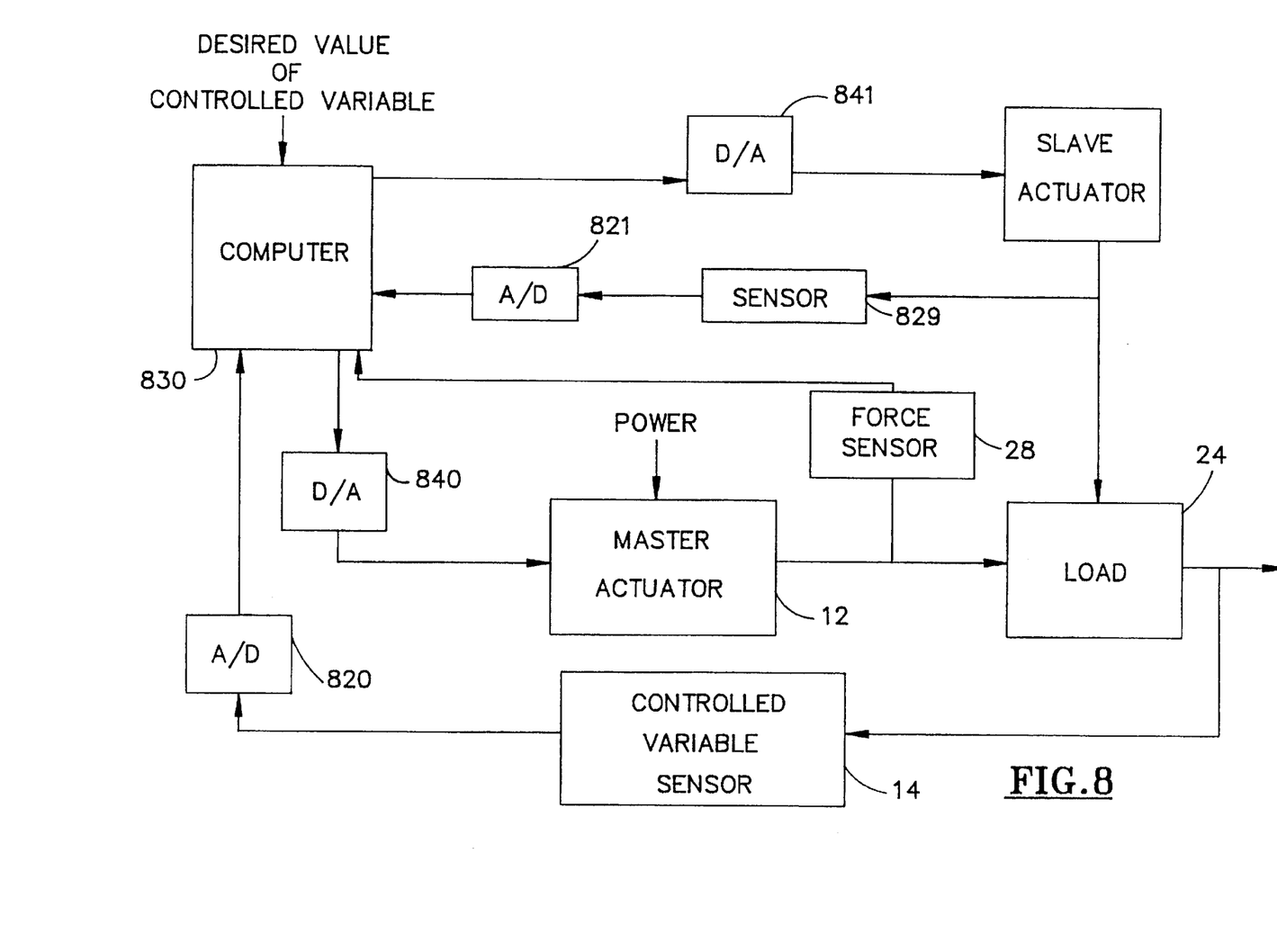
Figure 9:
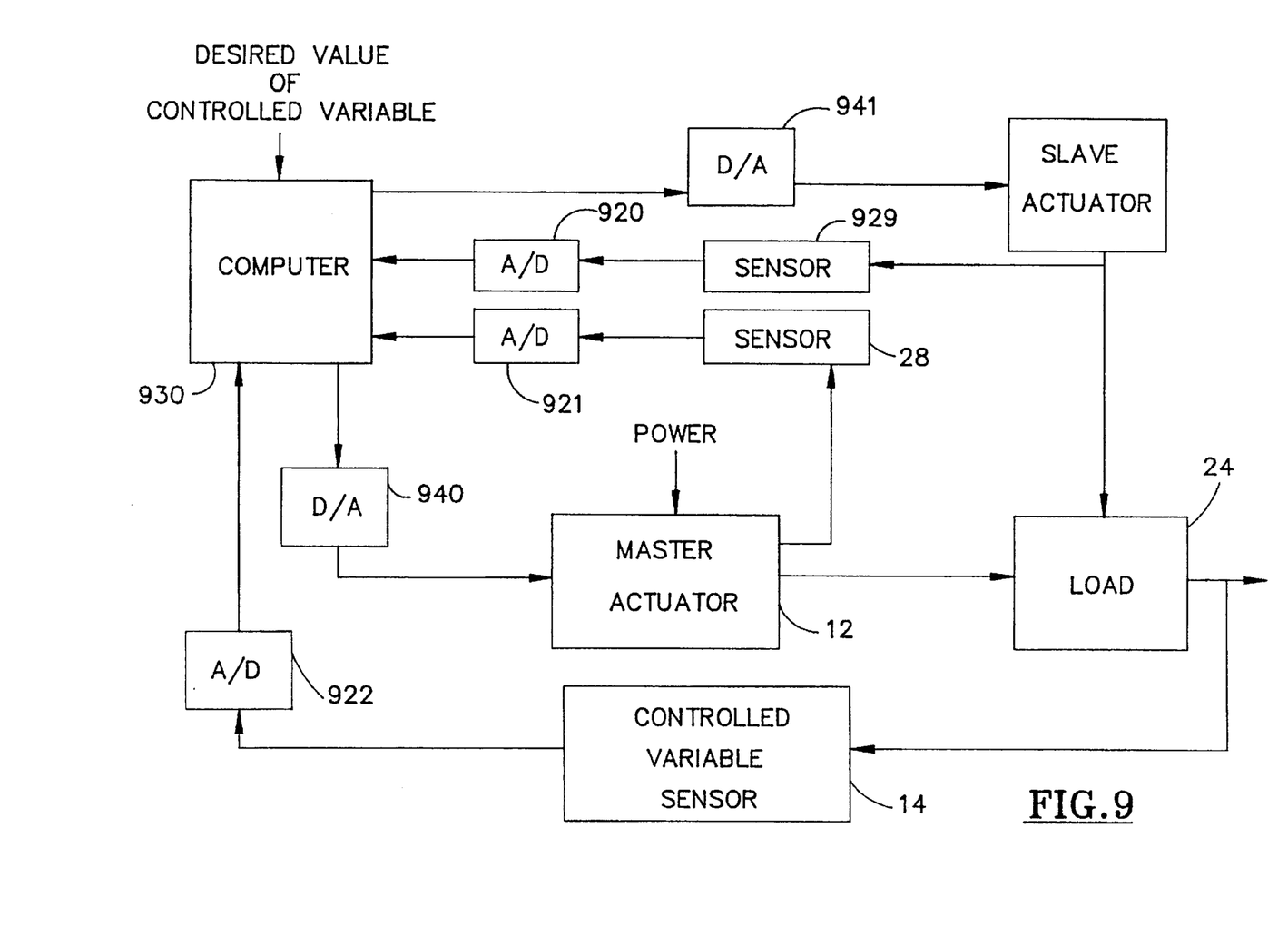

Control circuits may be constructed of discrete components or alternatively, as illustrated in FIGS. 7, 8 and 9 the control functions may all be performed by a general purpose digital computer or specialized microprocessor control system. Three such alternative systems are illustrated in FIGS. 7, 8 and 9. The signals from the force sensor 28 and the controlled variable sensor 14, may be applied to the digital computer 730, 830 or 930 utilizing conventional technology, in some cases requiring the use of conventional intermediate circuitry such as A/D converters 720, 820, 821, 920, 921, and 922 for converting signals from the sensor to digital signals. Similarly, the outputs from the computer may be applied to the master actuator and the slave actuator from the computer, in some cases requiring the use of conventional intermediate circuitry such as digital to analog converters 740, 840, 841, 940, and 941 for converting digital signals to signals useful for driving the actuators.

As will be apparent to those skilled in the computer art, the force applied by a master actuator and slave actuator may alternatively be calculated by computer, which is illustrated in FIG. 7. In that event, the force sensor 28 can be eliminated. In that event, the computer requires input of further parameters, such as the mass of the load. For example, if the reference input signal applied to the D/A converter 740 represents the controlled variable of acceleration, the force applied by the master actuator can be obtained as the product of that acceleration and the load mass.

The function of sensor 829 in FIG. 8 and 929 in FIG. 9 is the same as the function of sensor 629 in FIG. 6. The sensors can be force or torque sensors. The force or torque signal can be derived from sensing pneumatic or hydraulic pressure or electric current, voltage or power from an electric motor.

Figure 3:
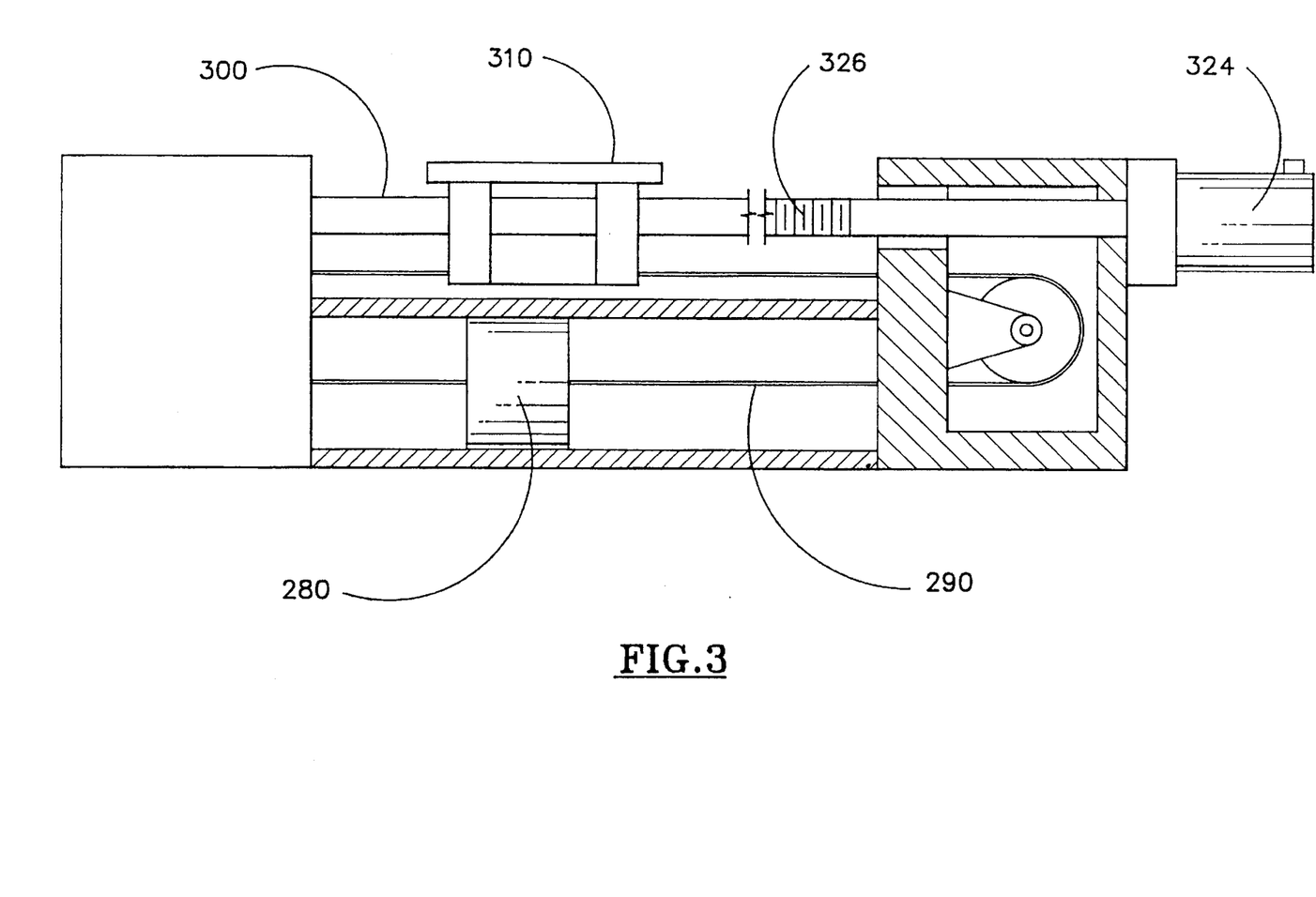
FIG. 3 is a view in axial section of a rodless actuator for use in the present invention.

FIG. 3 illustrates a combined master actuator and slave actuator for use in a rodless system. An electric motor 324 is connected by a screw mechanism 326 to drive a weight bearing platform 310 which is slidably mounted upon a track 300 and connected by power band 290 to opposite sides of the air piston 280 through two pulleys. Consequently, the electric motor may be utilized as the master actuator, while the air cylinder is utilized as the slave actuator.

Figure 4A:
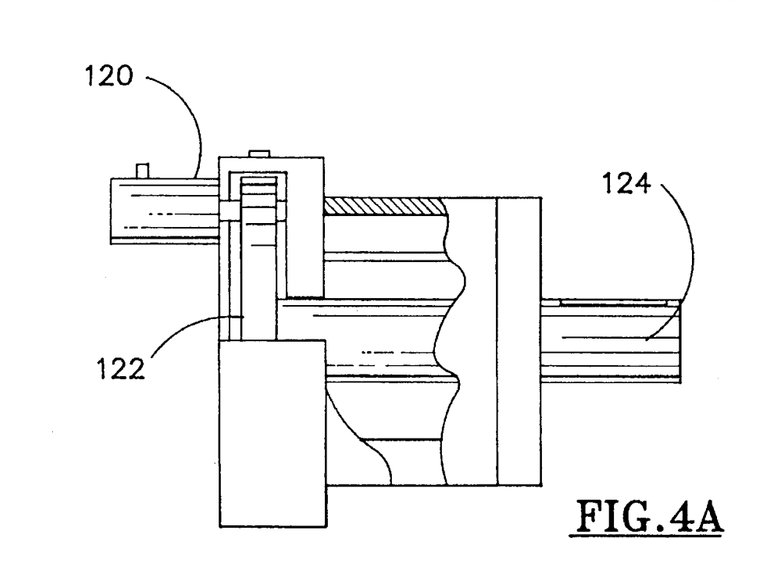
FIGS. 4A and 4B are views in axial section of two similar, alternative rotary actuators for use in the present invention.
Figure 4B:
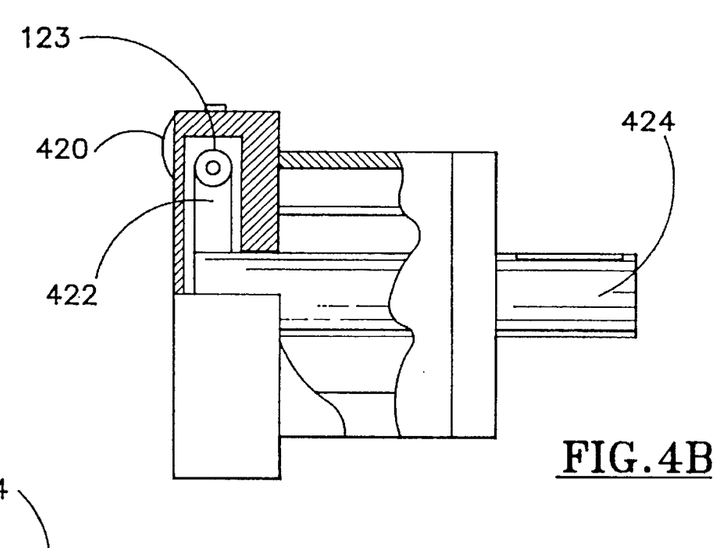

FIGS. 4A and 4B illustrate two alternative combined master actuator and slave actuator structures for use in a rotational system. In FIG. 4A an electric motor 120 is connected by suitable pulleys and drive belt 122 to drive a shaft 124 in rotation. A plurality of vanes 126 are also connected to the shaft to provide a fluid driven motor. Consequently, the electric motor may be utilized as the master actuator, while the vane motor is utilized as the slave actuator. FIG. 4B shows a similar structure except that the motor 420 is connected by a worm gear arrangement 422 to the shaft 424. Similarly, the structure illustrated in U.S. Pat. No. 4,782,258 may alternatively be used in rotational embodiments of the present invention if combined with control circuitry constructed and connected in accordance with the present invention.

Figure 5:
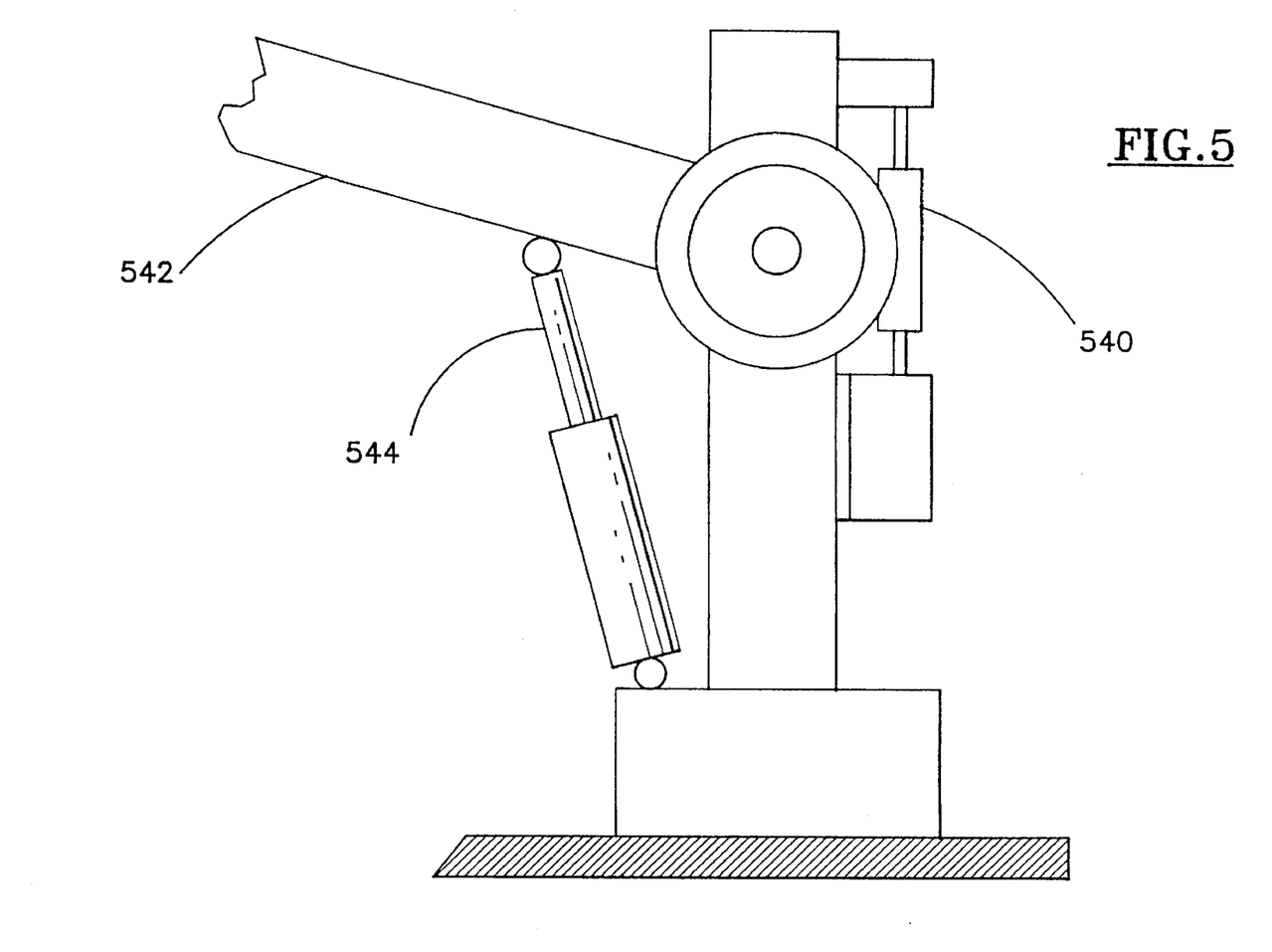
FIG. 5 is a view of an actuating system combining a fluid power linear actuator and an electric rotary actuator for use in the present invention.

FIG. 5 illustrates that an equivalent alternative structure would include a master actuator 540 mechanically linked to one side of a yoke 542 and a slave actuator 544 which is a fluid power actuator mechanically linked to the yoke. The yoke pivot is at the center of the worm gearing mechanism. When the electric motor drives the yoke 542 through the worm gear rotational motion, the linear slave actuator supplies additional force. Thus, it can be seen that a mechanically serial connection is not required for embodiments of the present invention.

FIG. 12 illustrates a portion of the start-up characteristics for an on/off type system described above in translating a load. Initially the force applied by the master actuator (illustrated with a dashed line) increases until it exceeds a preset limit at time $T_1$. At that point the slave actuator is turned fully on and its force increases. As the force applied to the load by the slave actuator increases, the force applied by the master will decrease since a higher proportion of the force required to translate the load will be derived from the slave. This will cause the force applied by the master to fall below the preset limit at time $T_2$, which will cause the valves to be switched so that fluid supply to the slave is interrupted at time $T_2$. This will in turn then cause the force applied by the slave to decrease, and the force applied by the master to increase until at time $T_3$ the cyclic operation then begins to repeat, as illustrated in FIG. 12. It does not appear to be where a preset limit is reached by the master actuator force.

The distribution of power or force from each system can be changed and varied by selection of a different control algorithm. FIGS. 10, 11, and 12 illustrate the distribution of power from the master and slave actuators. The slave force can be larger or smaller than the total load force, and the force difference or error between the total load and the force applied by the slave actuator is compensated or corrected by the master actuator. The proposed system therefore provides the accuracy of the master and the force of the slave and operates effectively even when the load varies during operation.

FIG. 10 and 11 illustrate operation with a slave force which is simply proportional to the master force above a desired master force value. With such a control algorithm, the force from the slave actuator will be a multiple of the force from the master actuator and the total force will be the sum of the two.

In FIG. 10, the force applied by the master actuator first increases until it exceeds a preset limit at time $T_4$. At that point the slave actuator starts to supply a force or power, which may be a certain function of the master force and its force increases. Meanwhile the force applied by the master will decrease since the total force applied by both the master and slave should equal the total load force. This will cause the force applied by the master to fall below the preset limit at time $T_5$, which will cause the valves to be switched. If the control system is capable of calculating the required slave force prior to or simultaneous with the action of the master actuator, the master and slave actuators may apply a force or power to the load at the same time, which is illustrated in FIG. 11. The master force in FIGS. 10, 11, and 12 is in both positive and negative modes, i.e. the electric motor is operated in both motor and generator modes at which the negative master force or the electromagnetic force will drag the mechanical body or the load.

The forces and other parameters described in this application are not limited to a single polarity, but rather may be of either polarity or direction. For example, during acceleration of a body toward a desired position, a force of one direction or polarity may be applied. However, in order to controllably decelerate the body, a force of the opposite direction may be applied by one or both actuators. For example, and in accordance with known principles, an electric motor may also operate as a generator to provide both a braking force and to allow the return of power from the mechanical system into a storage battery, which is also illustrated in FIGS. 10, 11, and 12. Some control algorithms, such as the on/off algorithm for controlling the slave actuator, may periodically cause the slave actuator to drive both the load to which the slave actuator is mechanically linked and also drive the master actuator which is also mechanically linked to the loads, and therefore under that condition the master and slave actuators may be applying forces or torques to the load in opposite directions, which is also illustrated in FIGS. 10, 11, and 12. Furthermore, in some systems the actuator system is utilized in a manner which stores energy in a system, such as the storage of potential energy from raising a weight to a higher level. When such a system is reversed, such as the lowering of the weight, the energy may be returned from the system into the actuator system. Thus, the forces and control systems may operate algebraically.

The supply force from the slave system to the load may not precisely match the demand of the load for several reasons, such as the control difficulties of the pneumatic device or the use of low performance control hardware or software, for example, on/off control or proportional control instead of servo control. As a result, the supply force of the slave actuator may be larger or smaller than the force needed to precisely drive the load. However, in the present invention the master actuator and control system is capable of correcting any error of the slave system force. Therefore the accuracy of the controlled variables, such as positioning and movement, is dependent upon the master control and actuator system. The correcting capability of the master actuator with the control error of the slave actuator is achieved by properly using a mechanism driven by an electric motor control system, and (not precisely) controlling the slave actuator.

For example, the maximum force output of a screw mechanism type linear actuator driven by an electric motor (master actuator) is 10 lb. in certain motion speed, and there is a 100 lb. load force needed to be driven. When a pneumatic cylinder is used as a slave linear actuator, the slave driving force should be controlled between 90 lb. to 100 lb. in order to avoid an overload on the electric motor. In other words, if the slave force is controlled within 90 lb. to 100 lb., the load force on the screw type linear actuator (master actuator) will be below 10 lb., so the electric motor will be operated normally, accordingly, the positioning and speed control functions of the screw type linear actuator (master actuator) can be achieved. Therefore, the master system can correct 10 lb. force error due to the control error of the slave actuator. If the electric motor can be operated in a negative mode, i.e. a generator mode, usually, the correcting capability of the master actuator may be larger, which means the slave control has wider error tolerance, i.e. precise control of slave actuator is not required.

The screw mechanism (may combine a gear mechanism) provides not only the kinematic and dynamic connections between the electric motor or slave actuator and the mechanical body, but also some specific mechanical advantages, because the magnitude of the force applied by the electric motor to the load, or, inversely, the magnitude of the process disturbance, such as transient load, the error of the supply force of the slave actuator to the electric motor through the mechanism is related to the parameters of the screw mechanism, such as screw pitch and thread number. Therefore, a different load relationship among the electric motor or master actuator, slave actuator, and mechanical body or load may be obtained by selecting different mechanism parameters. Also, if a screw mechanism or gearing with self-lock function or a combination device of a highly efficient ball screw and a gearing with self-lock function mechanism is used, the load, or transient load, or error of the supply force of the slave actuator, or their combination is not capable of driving the mechanical body either forward or backward when the motion of the electric motor is stopped, unless the electric motor is in the controlled motion. Therefore, the present system is also capable of holding the mechanical body without supplying power to either the master actuator, or the slave actuator, or both, after the mechanical body is properly positioned by the actuators.

Other known control techniques may be applied to embodiments of the invention. For example, a computer, preferably a computer used for the control functions, can be used to calculate a desired force based upon the mass and desired acceleration of a body. Therefore, the slave force may be applied to the load before or simultaneously with the action of the master actuator, which is illustrated in FIG. 7 and 11. Also, an acceleration sensor can be used for that purpose. Thus, the control algorithm for use in the control circuit for controlling the slave actuator can further include, following the detection of the force applied by the master actuator, a calculation of the desired total force, and by subtraction the desired force for application by the slave actuator. Use of a total force sensor for sensing the sum of the master actuator force and the slave actuator force which is applied to the load, combined with the accelerometer will permit calculation of the mass of the load and from that the calculation of the desired force.

Various kinds of conventional overload protection can also be provided. For example, the system may be deactivated if the load upon the master exceeds an alarm value for a selected time interval.

It would also be apparent to those skilled in the art that this system will require sufficient damping to prevent oscillation. Such damping may be built into the computer control algorithm in accordance with known principles, or by limiting or controlling the on time or off time of the valve in an on/off system to a selected value.

While certain preferred embodiments of the present invention have been disclosed in detail, it is to be understood that various modifications may be adopted without departing from the spirit of the invention or scope of the following claims.

We claim:

1. An apparatus for effecting and controlling the motion of a load and comprising:

(a) a master control system including a master actuator mechanically linked to the load for applying a force to the load, and a master actuator control connected to receive a reference input and control the master actuator to apply a force to the load responsive to the reference input to attain a desired value of a controlled motion variable in accordance with the value of the reference input;

(b) a fluid power slave actuator mechanically linked to the same load;

(c) means for generating a signal representing the force applied to the load by the master actuator; and (d) a slave actuator control connected to the master actuator force signal generating means to receive the signal representing the force applied to the load by the master actuator and connected to the slave actuator to controllably drive the slave actuator with a slave actuator force applied to the same load which is a function of the force applied to the same load by the master actuator, the slave actuator being operable to apply forces over a range from no slave actuator force when the total force applied to the load is within the operating range of the master actuator, to a slave actuator force whereby the slave actuator supplies most of the power of the motion.

2. An apparatus in accordance with claim 1 wherein the master control system is a closed loop system further comprising a controlled variable sensor mounted for detecting a controlled variable signal representing the controlled variable value for the load and connected to apply that value to the master actuator control.

3. A motion controlling apparatus in accordance with claim 2 wherein the controlled variable sensor is a displacement detector.

4. An apparatus in accordance with claim 1 wherein the slave actuator and the slave actuator control are a closed loop system further comprising a slave actuator force sensor mounted to detect the force applied by the slave actuator and connected to the slave actuator control for applying a signal representing the slave actuator force to the slave actuator control.

5. An apparatus in accordance with claim 1 wherein the master actuator force signal generating means comprises a force sensor mounted to detect the force applied to the load by the master actuator.

6. An apparatus in accordance with claim 5 wherein the master control system is a closed loop system further comprising a controlled variable sensor mounted for detecting a controlled variable signal representing the controlled variable value for the load and connected to apply that value to the master actuator control.

7. An apparatus in accordance with claim 6 wherein the slave actuator and the slave actuator control are a closed loop system further comprising a slave actuator force sensor mounted to detect the force applied by the slave actuator and connected to the slave actuator control for applying a signal representing the slave actuator force to the slave actuator control.

8. A motion controlling apparatus in accordance with claim 1 wherein the slave control drives the slave actuator at a force which, over a selected range of detected master actuator force is an increasing function of the master actuator force.

9. A motion controlling apparatus in accordance with claim 8 wherein the slave control drives the slave actuator at a force which, over a selected range of detected master actuator force is directly proportional to the master actuator force.

10. A motion controlling apparatus in accordance with claim 1 wherein the master actuator is driven by an electric motor having electric power input terminals and the slave actuator is a fluid power actuator.

11. A motion controlling apparatus in accordance with claim 1 wherein the master actuator is driven by an electric motor having electric power input terminals and the slave actuator includes an electric motor having electric power input terminals.

12. A motion controlling apparatus in accordance with claim 11 wherein the master actuator force signal generating means comprises an electrical circuit connected to the electric power device of the electric motor for metering the voltage and current to the electric motor for detecting the master actuator force.

13. A motion controlling apparatus in accordance with claim 1 wherein the slave control comprises a computer.

14. A motion controlling apparatus in accordance with claim 1 wherein the master control comprises a computer.

15. A motion controlling apparatus in accordance with claim 1 wherein the master control and slave control comprise a computer.

16. A motion controlling apparatus in accordance with claim 1 wherein the master actuator is driven by a stepper motor.

* * * * *

UNITED STATES PATENT AND TRADEMARK OFFICE
CERTIFICATE OF CORRECTION

PATENT NO. : 5,656,903
DATED : Aug. 12, 1997
INVENTOR(S) : Shui et al.

It is certified that error appears in the above-indentified patent and that said Letters Patent is hereby corrected as shown below:

Column 2, line 4 delete second occurrence of "size".

Signed and Sealed this

Fourth Day of November, 1997

*Attest:*

BRUCE LEHMAN

*Attesting Officer*     *Commissioner of Patents and Trademarks*